United States Patent
Read et al.

(10) Patent No.: US 10,539,027 B2
(45) Date of Patent: Jan. 21, 2020

(54) GAS TURBINE ENGINE

(71) Applicant: ROLLS-ROYCE plc, London (GB)

(72) Inventors: Simon Read, Derby (GB); Steven A Radomski, Nottingham (GB)

(73) Assignee: ROLLS-ROYCE plc, London (GB)

(*) Notice: Subject to any disclaimer, the term of this patent is extended or adjusted under 35 U.S.C. 154(b) by 475 days.

(21) Appl. No.: 15/204,694

(22) Filed: Jul. 7, 2016

(65) Prior Publication Data
US 2017/0022826 A1 Jan. 26, 2017

(30) Foreign Application Priority Data

Jul. 22, 2015 (GB) .................................. 1512900.0

(51) Int. Cl.
F01D 5/28 (2006.01)
F01D 5/14 (2006.01)
F01D 9/02 (2006.01)
B82Y 30/00 (2011.01)

(52) U.S. Cl.
CPC ................ *F01D 5/28* (2013.01); *B82Y 30/00* (2013.01); *F01D 5/147* (2013.01); *F01D 5/288* (2013.01); *F01D 9/02* (2013.01); *F05D 2220/32* (2013.01); *F05D 2220/36* (2013.01); *F05D 2230/30* (2013.01); *F05D 2230/31* (2013.01); *F05D 2240/121* (2013.01); *F05D 2240/303* (2013.01); *F05D 2300/17* (2013.01); *F05D 2300/50* (2013.01); *F05D 2300/605* (2013.01); *Y02T 50/672* (2013.01); *Y02T 50/673* (2013.01)

(58) Field of Classification Search
CPC . F01D 5/28; F01D 5/147; F01D 5/288; F01D 9/02; F05D 2240/303; B82Y 30/00
See application file for complete search history.

(56) References Cited

U.S. PATENT DOCUMENTS

| | | | |
|---|---|---|---|
| 2012/0082553 A1 | 4/2012 | Eleftheriou et al. | |
| 2012/0082556 A1* | 4/2012 | Macchia | F01D 5/147 416/241 A |
| 2013/0004324 A1* | 1/2013 | Hansen | C25D 1/006 416/224 |
| 2013/0199934 A1* | 8/2013 | Parkos, Jr. | C25D 1/02 205/50 |
| 2013/0224008 A1 | 8/2013 | Cheung et al. | |
| 2016/0108747 A1* | 4/2016 | Obuchi | F04D 29/542 415/200 |
| 2016/0138409 A1* | 5/2016 | Norton | B23P 15/04 415/208.1 |
| 2016/0160659 A1* | 6/2016 | Obuchi | F01D 5/147 415/200 |

FOREIGN PATENT DOCUMENTS

| | | |
|---|---|---|
| EP | 2 990 506 A2 | 3/2016 |
| WO | 2015/001827 A1 | 1/2015 |

OTHER PUBLICATIONS

Dec. 14, 2016 Search Report issued in European Patent Application No. 16 17 8190.
Apr. 27, 2016 Search Report issued in British Patent Application No. 1512900.0.

* cited by examiner

Primary Examiner — Brian P Wolcott
(74) Attorney, Agent, or Firm — Oliff PLC

(57) ABSTRACT

A blade or a vane for a gas turbine engine. The blade or vane having an aerofoil and a leading edge member attached to the aerofoil. The leading edge has an electrically conductive support member and a nano-coating formed on the support member.

15 Claims, 3 Drawing Sheets

GAS TURBINE ENGINE

TECHNICAL FIELD

The present disclosure concerns a blade, a vane, a fan, a gas turbine engine, and/or a method of manufacturing a blade and/or a vane.

BACKGROUND

Gas turbine engines are typically employed to power aircraft. Typically a gas turbine engine will comprise an axial fan driven by an engine core. The engine core is generally made up of one or more turbines which drive respective compressors via coaxial shafts. The fan is usually driven off an additional lower pressure turbine in the engine core.

The fan includes a plurality of blades arranged around a hub. The blades may be made from metallic materials or composite materials.

Fan blades generally include a leading edge, a trailing edge, a pressure surface extending from the leading edge to the trailing edge and a suction surface extending from the leading edge to the trailing edge. A function of the leading edge is to split and guide air onto the pressure and suction surfaces of the blade. As such, the leading edge of the blade should have minimal surface roughness to minimise aerodynamic penalties.

During operation of a gas turbine engine, one or more of the fan blades may be impacted by foreign objects, including a bird strike. The leading edge of the blade should be strong enough to withstand such impacts, and also have a fracture toughness that limits the onset of damage to the blade after an impact.

It is further desirable that the leading edge can resist water and particle erosion, to maintain aerodynamic performance, reduce any rework needed, and prolong the life of the blade.

Conventionally, a leading edge member is manufactured as a separate component to the remainder of the blade. This separate leading edge member is then bonded, e.g. using adhesive, to the remainder of the blade.

One method of creating a leading edge member is described in U.S. 2013/004324, which uses electroplating to form the leading edge of the blade. To form the leading edge using electroplating, a tool is placed in a bath and electricity is passed through the tool. Ions from a solution in the bath form a coating on the tool. The tool is then removed from the bath and separated from the coating. This coating is then adhered to a leading edge of an aerofoil portion of a blade.

SUMMARY OF DISCLOSURE

The present disclosure generally seeks to provide an improved leading edge member for a blade and/or a vane, and an improved method of forming a leading edge member using electroplating.

According to a first aspect there is provided a blade or a vane for a gas turbine engine. The blade or vane comprises an aerofoil, and a leading edge member attached to the aerofoil. The leading edge comprises an electrically conductive support member and a nano-coating (e.g. a nano-crystalline metallic layer) formed on the support member.

The leading edge is a separate component to the aerofoil and the two components are attached to form the blade or vane.

In the present application, as is conventional in the art, a chordwise direction refers to a direction extending from the leading edge to the trailing edge, and a spanwise direction refers to a direction extending from a blade root to a blade tip.

The leading edge member may be bonded to the aerofoil. For example, adhesive may be provided between at least a portion of the leading edge member and the aerofoil.

The support member may be considered to be a support body.

The support member may be made from a metal or a polymeric material treated to be conductive.

The support member may be a solid member (or body) or may be a cellular member (or body).

The support member may be shaped such that the support member defines the general shape of the leading edge of the blade or vane and the aerofoil defines the remainder of the general shape of the blade or vane.

The support member may be narrower at a position proximal to the leading edge of the leading edge member than at a position rearward of the leading edge (or a position proximal to a forward end or a trailing edge of the aerofoil). The support member may have a curved leading edge. The support member may define an arcuate surface. The arcuate surface may be provided proximal to the leading edge of the blade. The support member may define a planar surface. The planar surface may be provided proximal to the aerofoil. The support member may be connected to the aerofoil at the planar surface. The nano-coating may be provided on the curved leading edge and/or the arcuate surface.

The nano-crystalline metallic layer may form the entire gas washed surface of the leading edge member.

The nano-crystalline metallic layer may comprise a Nickel-Cobalt alloy, Nickel or a Nickel alloy, and/or Cobalt or a Cobalt alloy.

The leading edge member may comprise a front portion and a wing extending from the front portion towards the trailing edge.

The leading edge member may comprise a front portion and two wings extending from the front portion towards a trailing edge of the aerofoil.

One of the two wings may extend along a pressure surface of the aerofoil and the other of the two wings may extend along a suction surface of the aerofoil.

The front portion of the leading edge member may comprise the support member.

The wings may be bonded (e.g. adhered) to the aerofoil. A layer of adhesive may be provided between the wings and the aerofoil.

The blade or vane may comprise a plurality of support members. Each support member may have a surface coated with a nano-crystalline metallic layer.

The plurality of support members may be arranged to be stacked in a chordwise direction.

The plurality of support members may be arranged to be stacked in a spanwise direction.

According to a second aspect there is provided a method of manufacturing a blade or vane. The method comprises providing an aerofoil body, and providing a support member. The support member is electroplated to form a leading edge member; and the leading edge member is attached to the aerofoil body.

The method may further comprise providing a tool and removably (e.g. temporarily) fixing the support member to the tool. The method may comprise electroplating the support member and the tool. Once the support member and the tool have been electroplated, the method may comprise removing the tool.

The leading edge member may comprise a front portion and wings. The wings may be formed by electroplating the tool.

The leading edge member may be attached to the aerofoil by bonding the wings the aerofoil. The wings may be bonded using an adhesive.

The method may further comprise providing a further support member. The method may comprise stacking the further support member adjacent an electroplated support member. The method may comprise electroplating the further support member and the electroplated support member.

According to a third aspect there is provided a fan comprising a blade according to the first aspect.

According to a fourth aspect there is provided a gas turbine engine comprising a blade or a vane according to the first aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
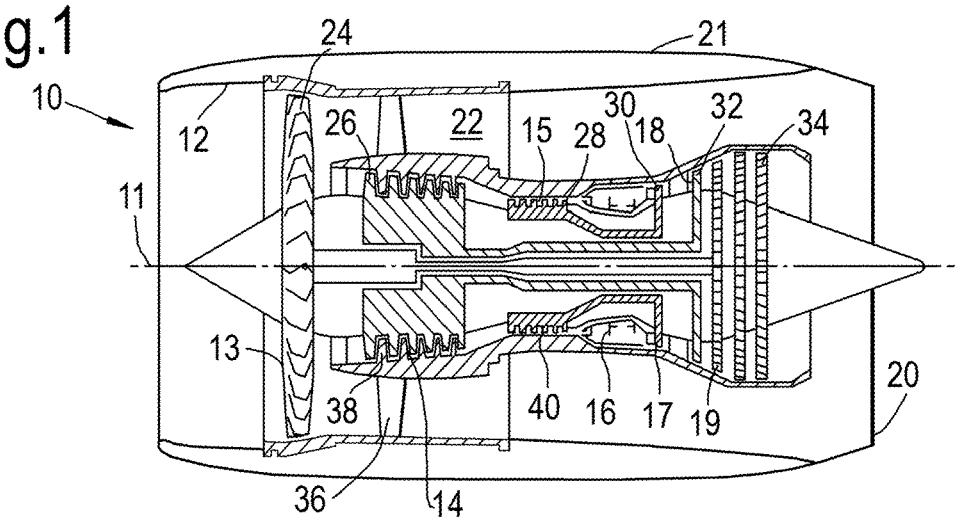
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

In a gas turbine engine there are a plurality of blade and vanes, for example the blades 24 of the fan 13, the blades 26, 28 of the compressors 14, 15, the blades 30, 32, 34 of the turbines 17, 18, 19, the outlet guide vanes 36 and the stator vanes 36, 40 of the compressors 14, 15.

Figure 2:
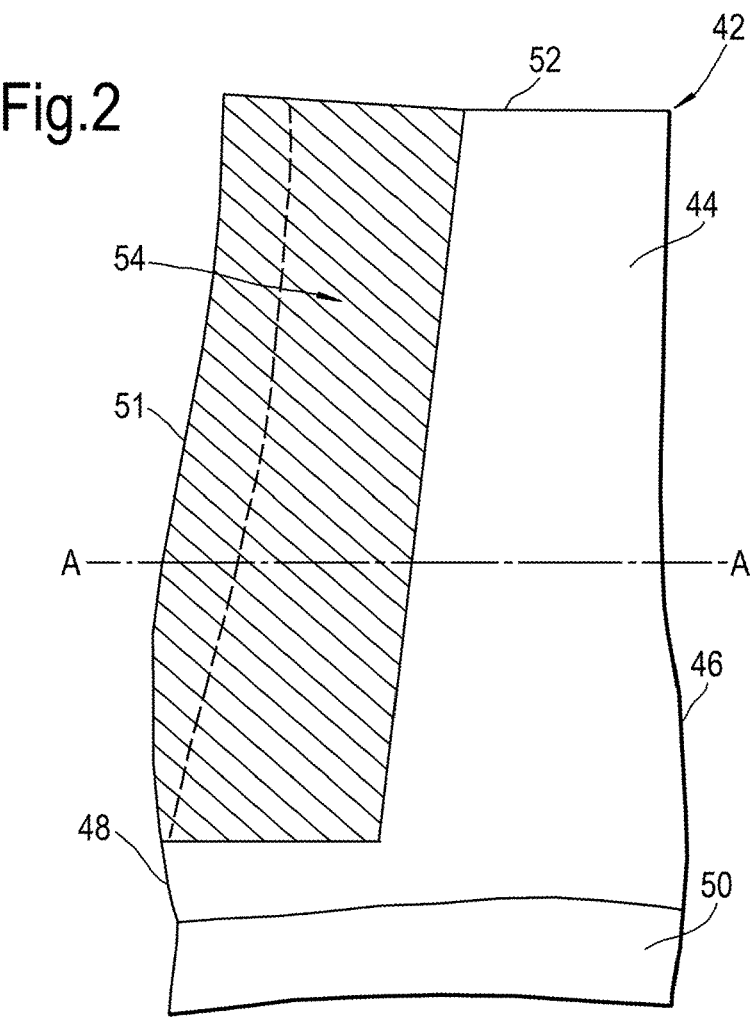
FIG. 2 is a side view of a blade with a leading edge member.

An example of a fan blade is indicated generally at 42 in FIG. 2. The fan blade includes an aerofoil portion, the aerofoil portion is made from composite material (e.g. comprises carbon fibre embedded in an epoxy resin). In alternative embodiments, the aerofoil may be made from a metallic material, e.g. from an aluminium alloy. In further alternative embodiments, the aerofoil may be made from a hybrid composite or a metal matrix composite (MMC), e.g. an aluminium MMC. The aerofoil portion defines a trailing edge 46 of the blade, a tip 52 of the blade, and a root 50 of the blade. The aerofoil portion also has a leading end 48 which is protected by a leading edge member 54. The leading edge member defines a leading edge 51 of the blade. The aerofoil portion may include a recessed region for accommodating the leading edge member creating a substantially smooth transition between the leading edge member and the aerofoil on the gas washed surface of the blade.

In the present application, a chordwise direction refers to a direction extending from a leading edge 51 to a trailing edge 46 and a spanwise direction refers to a direction extending from the root 50 of the blade to the tip 52 of the blade. As is conventional, leading and trailing edges and ends are defined with respect to the axial air flow through the gas turbine engine.

Figure 3:
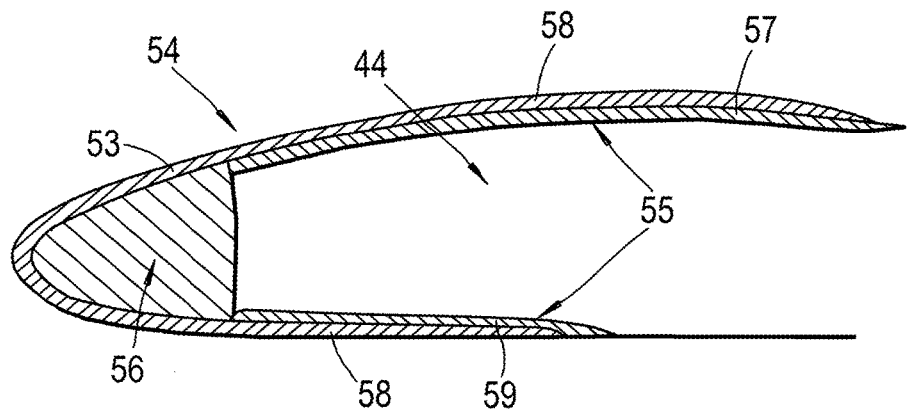
FIG. 3 is a sectional view of the blade of FIG. 2 along the line A-A in FIG. 2.

Referring now to FIG. 3, the leading edge member 54 includes a forward portion and two wings 58. The forward portion is adjacent the leading edge 48 of the aerofoil 44 and one wing 58 extends along and covers a portion of a suction surface 57 of the aerofoil, and the other wing 58 extends along and covers a portion of a pressure surface 59 of the aerofoil.

The forward portion includes a support member 56. In the present example, the support member extends in a spanwise direction along substantially the full length of the leading edge member 54. A trailing end face of the support member contacts, e.g. abuts, the leading end 48 of the aerofoil 44. The support member is narrower at its leading end than at its trailing end, so as to complete the aerofoil shape of the blade. The support member is electrically conductive. For example, the support member may be made from a metallic alloy (e.g. a nickel, steel, titanium, or tungsten alloy), or the support member may be made from a polymeric material treated so that it conducts electricity (e.g. using embedded carbon nanotubes).

The forward portion also includes a layer of nano-coating 53, which in this example is a nano-crystalline metallic layer. The nano-coating forms a "skin" of the leading edge member 54 and extends from the forward portion to form the wings 58. The nano-coating defines the entire gas washed surface of the leading edge member. The nano-coating in this example is a Nickel-Cobalt nano-coating, but in alternative embodiments it may be an alternative nano-coating, for example a nickel nano-coating or a cobalt nano-coating.

The leading edge member 54 is attached to the aerofoil. In the present application this is achieved by bonding (e.g. using adhesive 55) the wings 58 of the leading edge member to the aerofoil 44. In the present example, the support member is not bonded directly to the aerofoil, but in alternative embodiments the support member may be bonded to the aerofoil in addition to the wings.

The wings 58 of the leading edge member 54 will vary in size depending on the requirements of the blade and the dimensions of the blade. In particular, to achieve a desirable bond area between the leading edge member and the aerofoil 44, and to position the edge of a bond line between the aerofoil and the leading edge member away from peak stress locations on the aerofoil. In the present example, the wings 58 extend a different distance along the suction surface than along the pressure surface. However, in alternative embodiments, the length of the wings of the leading edge member may be the same on the pressure side of the blade and the suction side of the blade; and/or the length of the wings may vary in a spanwise direction along the blade. For example, the wings may be longest in a region where bird strike loads are expected to be greatest and where the threat of foreign object damage is most severe, e.g. at the tip of the blade.

Figure 4:
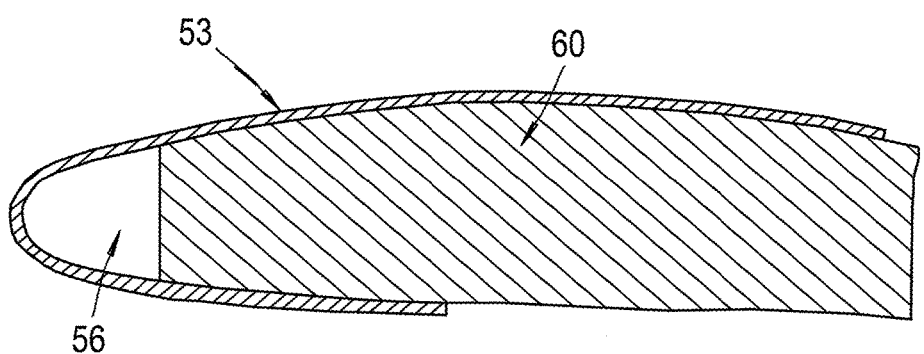
FIG. 4 is a sectional view of the leading edge member of the blade of FIG. 3 on a tool.

Referring to FIGS. 3 and 4, to manufacture the blade 42 shown in FIGS. 2 and 3, the support member 56 is provided. The support member is then temporarily (e.g. removably) fixed to a tool 60. Examples of how to temporarily fix the support to the tool include: the tool optionally having fixtures to clamp the tool and support member together; additionally or alternatively, pins or screws may be used; and further additionally or alternatively, a thermoplastic adhesive may be used and the assembly may be heated to remove the support member from the tool.

The tool and the support member are then placed in an ion bath for electroplating. The tool and support member are connected to an electrical source and electrical current is passed through the tool and support member. This causes the nano-coating to be electroplated onto the surface of the support member and the tool. Once a desired thickness of coating is applied to the support member and the tool, the electricity supply is disconnected and the support member and tool are removed from the bath. The support member and tool can be progressively extracted from the bath to allow for a different thickness of 'skin' (or nano-coating) to be formed at different radial locations.

Next, the support member together with the nano-coating is removed from the tool, leaving the forward portion (including the support member 56 and the nano-coating 53) and the wings 58 of the leading edge member 54.

An aerofoil 44 made from a suitable material, in this case a carbon fibre resin matrix composite material, is provided. The leading edge member 54 is attached to the aerofoil. In this example the wings 58 are bonded to the aerofoil 44 using an adhesive 55.

Figure 5:
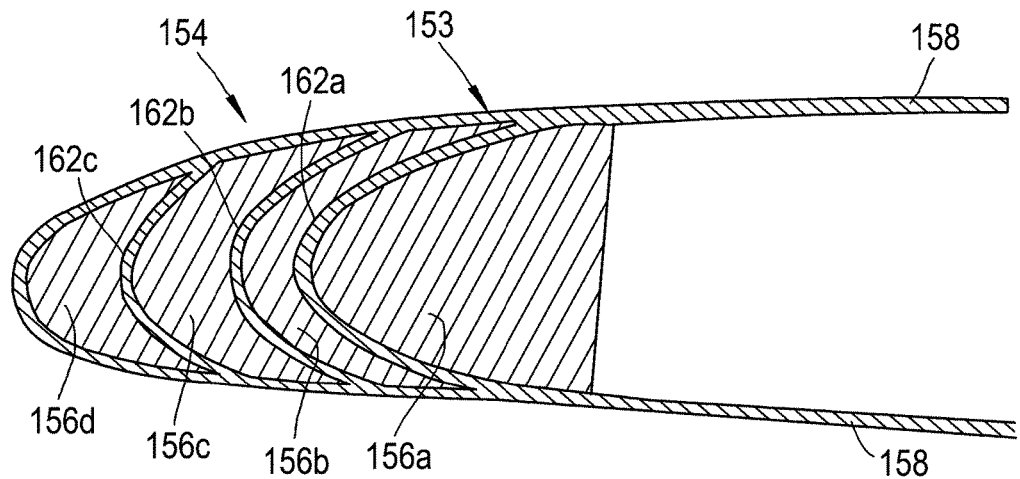
FIG. 5 is a sectional view of an alternative leading edge member.

With reference to FIG. 5, an alternative leading edge member 154 will be described. Similar features are given similar reference numerals but with a prefix "1" to distinguish between embodiments. Only the differences between the embodiment of FIG. 4 and the embodiment of FIGS. 2 and 3 will be described.

The leading edge member 154 includes multiple support members 156a, 156b, 156c, and 156d. The support members are stacked in a chordwise direction. A nano-coating 153, in this example a nano-crystalline metallic layer, is provided on the support member nearest the leading edge and this extends to form wings 158. Each support member has a nano-coating. The support members having a leading edge surface internal to the leading edge member have a nano-coating 162a, 162b, 162c that is internal to the leading edge member.

The support members 156b, 156c and 156d may be selected to be made from a material that is easier to machine than the nano-coating. In such examples, if a region of the leading edge member becomes damaged, the nano-coating and support member in that region can be removed to expose a nano-coating that was previously internal to the leading edge member. In this way, blades can be more easily re-profiled to repair damage.

Figure 6:
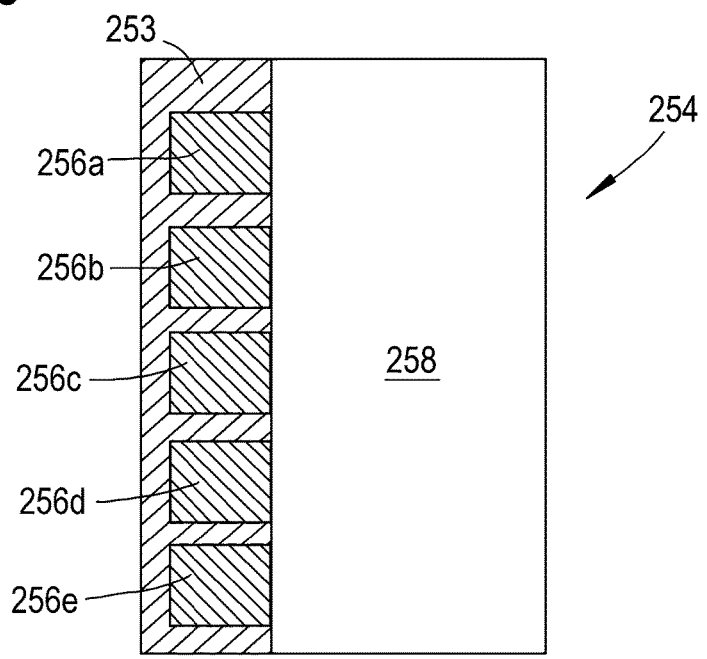
FIG. 6 is a sectional side view of a further alternative leading edge member.

A further alternative embodiment is shown in FIG. 6, similar reference numerals are used as for the embodiment of FIGS. 2 and 3, but with a prefix "2". Only the differences between the embodiments will be described.

The leading edge member 254 shown in FIG. 6 includes a plurality of support members 256a, 256b, 256c, 256d, 256e stacked in a radial direction (e.g. in a spanwise direction). In the present example, nano-coating 253, in this example a nano-crystalline metallic layer, is provided between the support members. The stack of support members are coated with a nano-coating, and the nano coating forms the gas washed surface of the leading edge member, including the wings 258.

Providing a plurality of support members 256a, 256b, 256c, 256d and 256e stacked in a radial direction can encourage break-up of the leading edge member in the event that a fan blade is released from the fan.

In further alternative embodiments the support member or support members may optionally have regions of weakness to encourage break-up of the leading edge member in the event of a fan blade being released from the fan.

The leading edge member 54 and aerofoil 44 have been described with reference to a fan blade, but in alternative embodiments the leading edge member and aerofoil may form part of an alternative blade of a gas turbine engine. In further alternative embodiments the leading edge member and aerofoil may define a vane.

The described embodiments provide a stator or a vane with a support member, the material of which can be varied independently of the nano-coating. The support member material can be selected to meet desired functional requirements, for example optimising for weight, cost, performance, or reduction of containment loads.

The provision of a support member also means that the nano-coating can be thinner than it would need to be without the support member. This means that the time taken to manufacture the leading edge member can be reduced.

As described, the provision of a support member also means that it is possible to configure the leading edge member so as to ease repair of the leading edge member. The support member can also be configured to encourage break-up of the leading edge member in the event of a fan blade being released from the fan, so as to reduce containment loads.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A blade or a vane for a gas turbine engine, the blade or vane comprising:
   an aerofoil; and
   a leading edge member attached to the aerofoil;
   wherein the leading edge member comprises a plurality of electrically conductive support members and a nano-crystalline metallic layer formed on the plurality of electrically conductive support members,
   wherein the leading edge member defines a general shape of a leading edge of the blade or vane, and the aerofoil defines a general shape of a remainder of the blade or vane,
   wherein the nano-crystalline metallic layer extends from a forward portion of the leading edge member to form first and second wings, the first wing extending a greater distance from the leading edge member toward a trailing edge of the aerofoil than does the second wing, and
   wherein each electrically conductive support member of the plurality of electrically conductive support members has a surface coated with the nano-crystalline metallic layer, the plurality of electrically conductive support members arranged to be stacked in a chordwise or in a spanwise direction.

2. The blade or vane according to claim 1, wherein the nano-crystalline metallic layer comprises a Nickel-Cobalt alloy, Nickel or a Nickel alloy, and/or Cobalt or a Cobalt alloy.

3. The blade or vane according to claim 1, wherein the front portion of the leading edge member comprises the plurality of electrically conductive support members.

4. The blade or vane according to claim 1, wherein the first and second wings are bonded to the aerofoil.

5. The blade or vane according to claim 1, wherein the plurality of electrically conductive support members are arranged to be stacked in a chordwise direction.

6. The blade or vane according to claim 1, wherein the plurality of electrically conductive support members are arranged to be stacked in a spanwise direction.

7. The blade or vane according to claim 1, wherein the plurality of electrically conductive support members are made from a metallic or a polymeric material treated to be conductive.

8. The blade or vane according to claim 1, wherein the plurality of electrically conductive support members define a curved leading edge on which the nano-crystalline metallic layer is provided.

9. A method of manufacturing a blade or vane, the method comprising:
   providing an aerofoil body;
   providing a plurality of electrically conductive support members each having a surface coated with a nano-crystalline metallic layer, wherein the plurality of electrically conductive support members are arranged to be stacked in a chordwise or in a spanwise direction;
   electroplating the plurality of electrically conductive support members to form a leading edge member; and
   bonding the leading edge member to the aerofoil body.

10. The method according to claim 9, further comprising providing a tool and removably fixing the plurality of electrically conductive support member to the tool;
   electroplating the plurality of electrically conductive support member and the tool; and
   once the plurality of electrically conductive support member and the tool have been electroplated, removing the tool.

11. The method according to claim 10, wherein the leading edge member comprises a front portion and wings, and wherein the wings are formed by electroplating the tool.

12. A gas turbine engine comprising a blade or a vane according to claim 1.

13. A blade or a vane for a gas turbine engine, the blade or vane comprising:
   an aerofoil; and
   a leading edge member attached to the aerofoil;
   wherein the leading edge member comprises a plurality of electrically conductive support members and a nano-crystalline metallic layer formed on the plurality of electrically conductive support members,
   wherein each of the plurality of electrically conductive support members has a surface coated with the nano-crystalline metallic layer, and
   wherein the plurality of electrically conductive support members are arranged to be stacked in a chordwise or a spanwise direction.

14. The blade or vane according to claim 13, wherein the plurality of electrically conductive support members are arranged to be stacked in a chordwise direction.

15. The blade or vane according to claim 13, wherein the plurality of electrically conductive support members are arranged to be stacked in a spanwise direction.

* * * * *